Dec. 15, 1959     R. E. STANDLICK ET AL     2,917,133
AUTOMATIC LUBRICATOR FOR CONVEYOR MECHANISM Filed April 12, 1957     5 Sheets-Sheet 3

INVENTORS
RONALD E. STANDLICK
DONALD E. TRUMBULL
BY
*Burton & Parker*
ATTORNEYS

INVENTORS
RONALD E. STANDLICK
DONALD E. TRUMBULL
BY
Burton & Parker
ATTORNEYS

United States Patent Office 2,917,133
Patented Dec. 15, 1959

2,917,133

AUTOMATIC LUBRICATOR FOR CONVEYOR MECHANISM

Ronald E. Standlick, Royal Oak, Mich., and Donald E. Trumbull, Inglewood, Calif., assignors to Pyles Industries, Inc., Detroit, Mich., a corporation of Michigan Application April 12, 1957, Serial No. 652,620

15 Claims. (Cl. 184—15)

This invention relates to improved lubricating mechanism for a traveling conveyor.

An object is to provide an improved lubricator which is adapted to be associated with a conveyor such as is employed in factories or the like to move parts from one place to another and which lubricator is adapted to lubricate the conveyor during travel and without slowing up the travel of the conveyor.

Conveyors of the type for which the lubricator is provided commonly comprise a stationary supporting rail of the I-beam type and a series of trolley assemblies coupled together in succession by an endless chain or the like to be moved along over the rail. These trolley assemblies are provided with hangers or other devices adapted to support pieces of work which are carried along from one place to another. The trolley assemblies are provided with lubricant-receiving fittings whereby they may be lubricated. Commonly the work is carried through heated chambers where the work parts are treated. The heat in such chambers is such as to destroy the grease or oil that has been applied to the conveyor trolleys. Heretofore it has frequently been necessary to lubricate conveyor fittings by hand and to stop the movement of the conveyor at times to perform such lubrication.

Attempts which have been made to lubricate conveyor trolleys while in motion automatically have met with the difficulty that the trolley wheels furnished by different manufacturers in the same diameter size frequently vary in axial dimension and shape. Due to these differences in axial dimension and shape, the automatic greasing device may be required to move different distances from its point of rest to the part to be lubricated to engage the same. Inasmuch as the trolley mechanism is moving continuously and at a constant rate of speed, the greasing device may successfully engage one lubricant fitting to lubricate it but due to a required different distance of travel to engage another fitting, it may fail to make connection therewith and fail to lubricate it.

An object of this invention is the provision of lubricating mechanism so constructed that it will properly engage and lubricate fittings on the trolley assemblies as they move along. The lubricating mechanism is so designed that the greasing nozzle will establish connection with the fittings to be lubricated as they succeed one another even though such fittings may vary somewhat in the distance they normally stand from the idle position of the greasing device with respect to the conveyor.

Another object is the provision of a lubricator of the character described wherein the greasing device is moved quickly into connection with the fitting to be lubricated when such fitting comes into registration with the greasing device. The greasing device then moves along with the fitting and at the same rate of speed for the required distance of travel to lubricate the fitting. Such greasing device is then disengaged from the fitting and returned to its normal idle position to engage a succeeding fitting to be lubricated.

In asmuch as trolley wheel assemblies are customarily supported on opposite sides of a stationary I-beam rail, complementary greasing devices are provided upon opposite sides of the rail to lubricate the trolley assemblies on both sides of the rail.

A meritorious feature of the invention is that the lubricant injector which makes connection with a lubricant fitting to lubricate the same is supported for reciprocation toward and away from the rail of the conveyor to be brought into connection with successive lubricant fittings of the moving trolley assembly; and such injector is also supported for reciprocation parallel with the path of travel of the trolley assemblies over the rail so that when connection of the injector with the lubricant fitting has been made, the injector can move with the fitting and parallel to its path of travel to complete the lubrication of the fitting.

Another meritorious feature is that the injector actuating mechanism which moves the injector both parallel with and normal to the path of travel of the lubricant fitting includes tripping means so positioned with respect to the trolley assembly which travels over the conveyor rail that the tripping means is automatically responsive to the positioning of a trolley for lubrication and in its response initiates the movement of the injector actuator mechanism to move the injector lubricant nozzle to lubricate the fitting.

A further meritorious feature is that the operating mechanism is adjustable so that the movement of the lubricant injector parallel to and in the same direction as the lubricant fitting to be lubricated may be regulated in order that the injector will be reciprocated at the same rate of speed as the lubricant fitting during its movement in the same direction as the fitting. While the injector moves with the fitting at the same rate of travel as the fitting, when the injector is disengaged from the fitting, it will be returned to its normal idle position at a much more rapid speed.

A further meritorious feature is that when the tripping mechanism which forms a part of the injector actuator system is actuated to initiate the movement of the ejector, the initial movement of the injector actuating mechanism projects the injector toward the conveyor rail and establishes the connection between the injector and the fitting to be lubricated and thereafter the movement of the injector actuating mechanism causes the injector to travel with the fitting to complete the lubrication. The construction is such that the injector is moved toward the fitting to establish connection therewith at a rapid rate of speed and its speed of travel is such that connection will be made with the fitting even though successive fittings may be spaced slightly different distances from the normal idle position of the injector.

Other objects, advantages, and meritorious features will more fully appear from the following description, claims, and accompanying drawings, wherein:

This lubricator mechanism comprises a lubricant injector which is mounted upon the trolley supporting rail to overhang a side of the rail alongside of the trolley wheels moving thereover. The injector communicates with a source of lubricant under pressure to receive lubricant therefrom. The injector proper itself is supported to be reciprocated toward and away from the trolley rail to make connection with lubricant fittings of the trolleys traveling over the rail. It is also supported to be reciprocated parallel to the path of travel of the trolleys over the rail to move along with the lubricant fitting once connection is made therewith to lubricate the fitting.

Suitable fluid pressure piston and cylinder mechanism is coupled with the injector to reciprocate it both toward and away from the rail and parallel therewith. A suitable fluid pressure system is provided and communicates with the piston and cylinder. The piston and cylinder mechanism is coupled with the lubricating injector to reciprocate the same both toward and away from the rail and parallel therewith. The fluid pressure system is equipped with suitable control valves and is shown schematically in Figs. 8 and 9.

In the drawings a conventional trolley conveyor is shown. This conveyor embodies a stationary I-beam rail shown particularly in Figs. 1, 2, and 3, and indicated by the numeral 20. A pair of trolley wheels 22 of a trolley assembly provided with hangers 24 are adapted to travel over opposite sides of the lower flange of the I-beam 20 as shown in the figures of the drawing. To supply lubricant to a trolley wheel, a lubricant fitting of the nipple type is indicated at 26. It is understood that both wheels would be provided with such a fitting. A lubricator device would be mounted upon each side of the rail to lubricate the fitting on such side. The fitting may be of the Alemite type.

Figure 1:
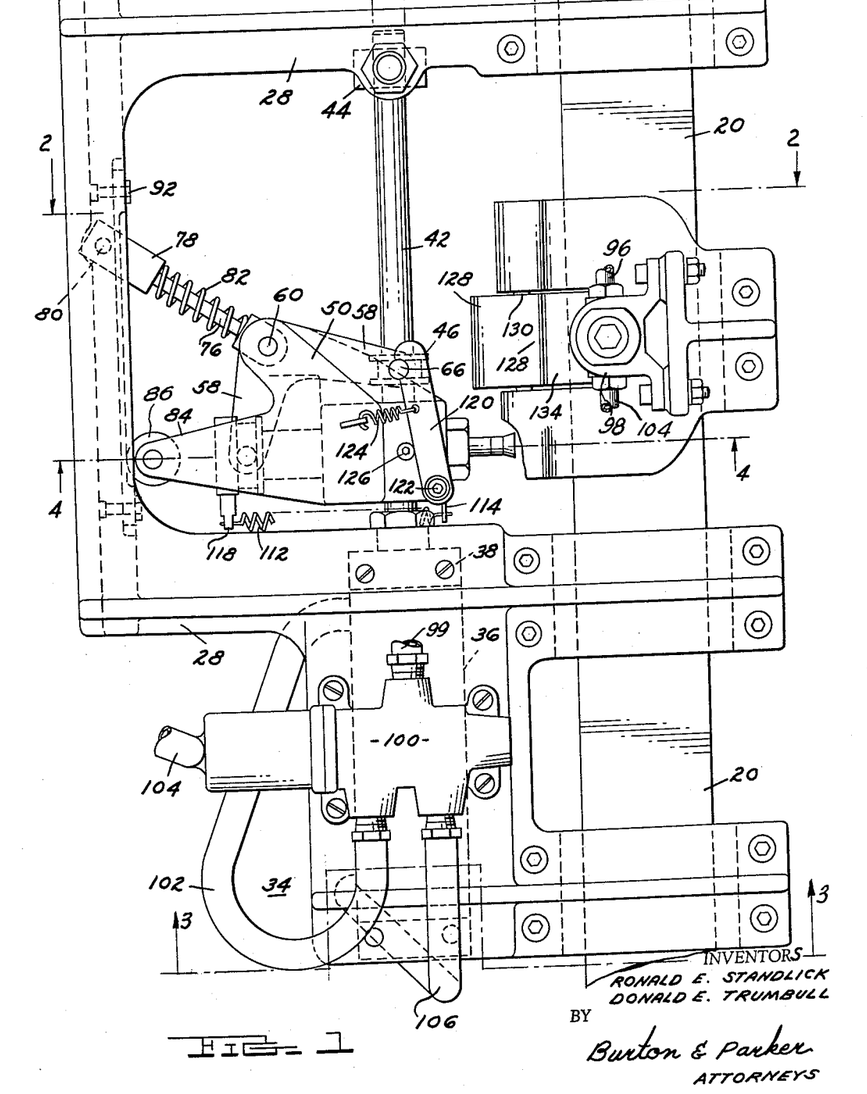
Fig. 1 is a plan of the lubricator of this invention shown as supported upon a section of a conveyor rail to lubricate the fitting of a trolley assembly traveling over the rail.
Figures 2, 3:
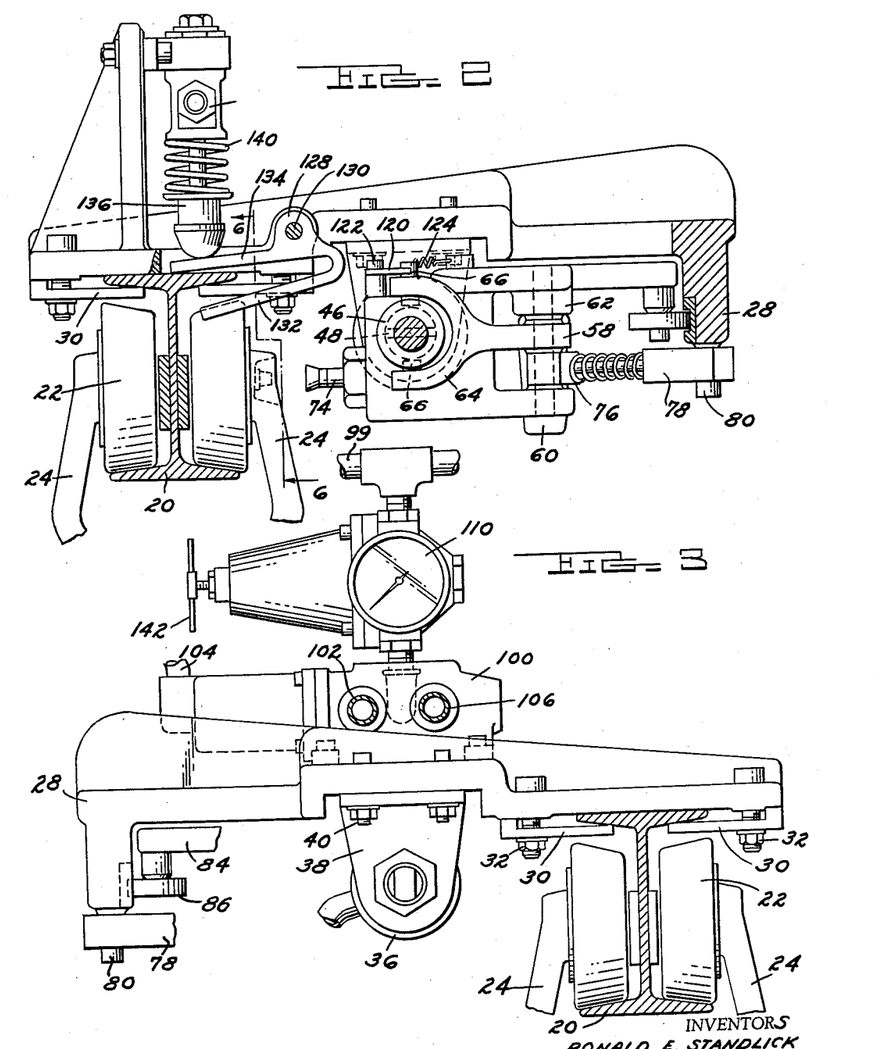
Fig. 2 is a vertical sectional view taken on the line 2—2 of Fig. 1.
Fig. 3 is a vertical sectional view taken at right angles to the view of Fig. 2 and on the section line 3—3 of Fig. 1.

The lubricator mechanism as a unit includes a frame such as is shown in 28 in Fig. 1. This frame overhangs and is supported from the rail by clamps 30. Tightening bolts 32 are provided to tighten the clamps against the upper flange of the rail as shown in Figs. 2 and 3 so that the frame hangs out over one side of the rail and supports the lubricating device. Three clamp assemblies are shown in Fig. 1. The two clamps at the bottom of Fig. 1 are shown as supporting that end of the frame which carries the fluid pressure piston and cylinder device. The opposite end of the frame supports the lubricant injector.

In Fig. 1 the fluid pressure cylinder assembly is indicated by the numeral 34. It comprises a cylinder 36 supported by end plates 38 which are secured to the frame by bolts 40 and depend therebelow. This cylinder is provided with a piston 42. The piston extends through the frame as shown in Fig. 1. The free end of the piston is supported for reciprocation within a bearing block 44 in the opposite end of the frame. The piston itself carries a spool-like collar 46. The collar is secured to the piston by pin 48 as shown in Fig. 2.

Figure 4:
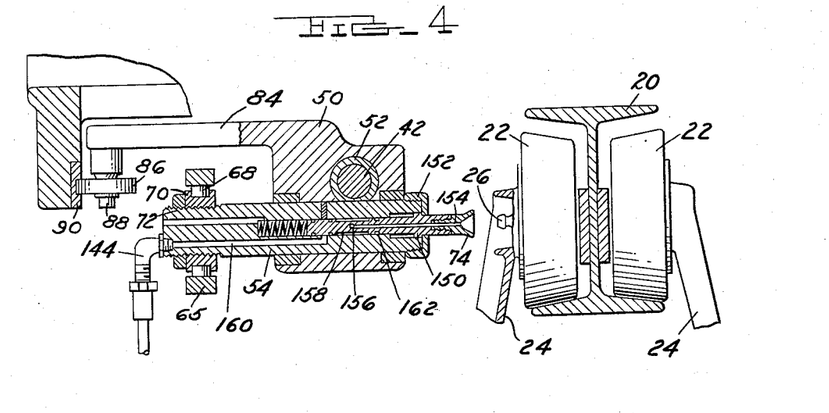
Fig. 4 is a fragmentary vertical sectional view taken on the line 4—4 of Fig. 1 showing the lubricator injector in the idle position disconnected from the lubricant fitting.
Figure 5:
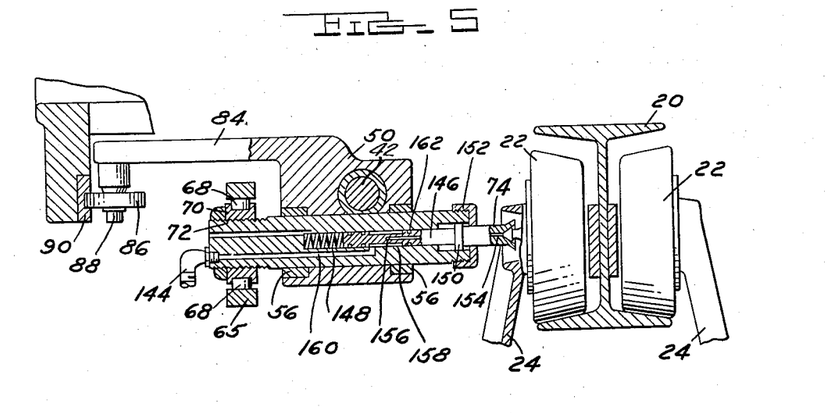
Fig. 5 is a fragmentary vertical sectional view taken on the same line as Fig. 4 but also taken on the line 5—5 of Fig. 7, and showing the lubricator injector in the operating position and connected with the lubricant fitting to lubricate the same.
Figure 6:
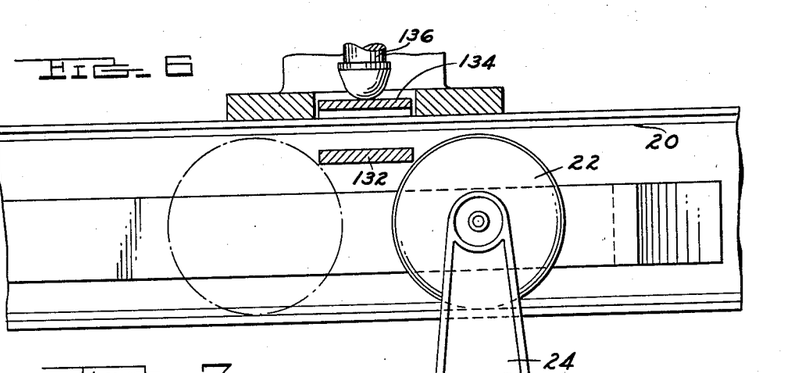
Fig. 6 is a vertical sectional view taken on the line 6—6 of Fig. 2.
Figure 7:
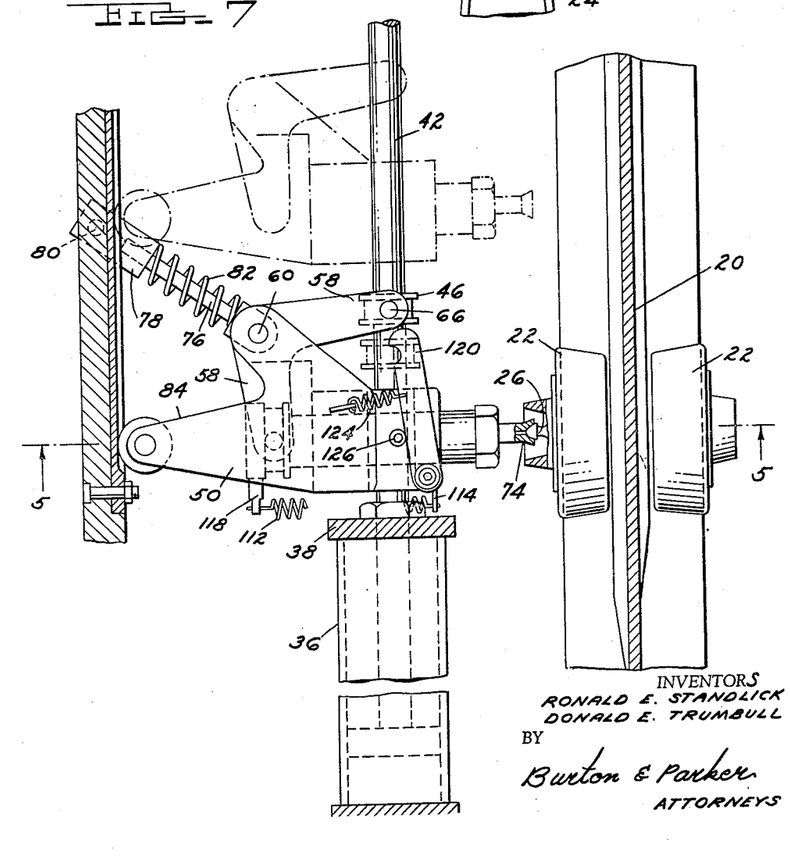
Fig. 7 is a fragmentary plan partly in section and partly in elevation showing the lubricator injector coupled with a lubricant fitting and showing two positions of the injector in its travel parallel with the path of travel of the fitting.

The lubricant or grease injector assembly is supported upon the piston while permitting limited travel of the piston therethrough, all as shown in Figs. 1, 4, 5, and 7. This injector mechanism is coupled with a suitable source of lubricant under pressure to receive lubricant as required therefrom. This injector assembly comprises a housing or frame 50 shown in plan in Fig. 1. The housing is supported upon the piston 42 and the piston extends slidably through the body of the housing as shown in Figs. 4 and 5, a bearing 52 being shown as encircling the piston. The housing carries for slidable reciprocation therethrough the lubricant injector or greaser 54. This injector is in the form of a cylindrical body member supported within the housing 50 within bearings 56 for slidable reciprocation toward and away from the conveyor and perpendicular with respect to the path of travel of the trolleys as hereinafter described. The entire injector housing is coupled with the piston 42 to travel with the piston parallel with the path of travel of the trolley assemblies upon the conveyor rail.

The injector housing is coupled with the piston by a bell crank like lever 58 pivoted upon pin 60 within a bifurcated arm extension of the housing 50 as shown in Figs. 1 and 2. The upper bifurcation of the arm of the housing, Fig. 2, is provided with a boss 62 which projects downwardly toward the bell crank lever 58 as shown.

One end of the bell crank lever is shown as formed in the shape of a yoke 64 (Fig. 2). Opposite arms of this yoke are provided with opposed inwardly projecting pins 66. These pins engage within the spool-like collar 46 of the piston 42 so that when the piston starts to move outwardly from the cylinder, the bell crank lever swings from the solid line position shown in Fig. 1 to the solid line position shown in Fig. 7.

The other arm of the bell crank lever 58 is formed in the shape of a yoke 65 as shown in Fig. 5. The two arms of this yoke are provided with opposed internally projecting pins 68. These pins 68 are received within a spool-like collar 70 that is threadedly engaged upon the threaded end 72 of the injector body 54. When the bell crank lever is swung from the position shown in Fig. 1 to the solid line position shown in Fig. 7, it thrusts the injector toward the trolley assembly as shown in Fig. 5. The normal retracted position of the injector is shown in Fig. 4. The construction of the injector for the discharge of lubricant and the functioning thereof is hereinafter described but once the injector nozzle 74 has engaged the fitting 26, the bell crank lever will have been swung to the solid line position shown in Fig. 7. As the piston 42 continues to move outwardly, the injector housing and assembly will be pulled along by the piston through the connection formed therewith by the bell crank lever and the injector will travel parallel with the path of the travel of the trolley wheels so as to complete the injection of lubricant into the fitting.

The injector housing is provided with a telescoping link assembly which tends to hold the housing against movement by the piston 42 until after the bell crank lever has been swung as hereinabove described. One end portion of this link consists of a pin 76 which is pivoted upon the pin 60 as shown in Fig. 2, which pin 60 serves as the pivotal mounting for the bell crank lever 58. The outer end of this pin 76 is telescopically received within a tubular socket portion 78 which is pivoted by a pin 80 to the frame 28 as shown particularly in Figs. 1, 2, and 7. A spring 82 encircles the pin 76 between the socket portion 78 and the injector housing 50 and exerts a pressure upon the injector housing tending to hold the injector in the position shown in Fig. 1 until the bell crank lever 58 has been swung to effect connection of the injector nozzle mouth 74 with the fitting 26. Once this connection is made and the movement of the injector toward the trolley rail has been stopped, the injector housing is pulled along with the piston rod 42. The spring 82 yields to permit the injector body to move with the piston to the dotted line position shown in Fig. 7.

The injector housing is provided with an extension 84 which projects toward the frame 28. The outer end of this extension carries a roller 86 journaled upon a pin 88. This roller engages a guide rail 90 secured to the frame 28 by studs 92 all as shown in Figs. 1, 4, and 5.

The injector housing is reciprocated parallel to the conveyor rail and the injector body is reciprocated within the housing perpendicular to the rail by injector actuating mechanism. This actuating mechanism is in the form of a piston and cylinder device responsive to fluid pressure in a fluid pressure system schematically shown in Figs. 8 and 9. This system includes suitable control valves to selectively actuate the piston in one direction or the other and to move the piston at different rates of speed. The component parts of the fluid pressure system are hereinafter described but the schematic diagrams of Figs. 8 and 9 generally illustrate the same.

Figure 8:
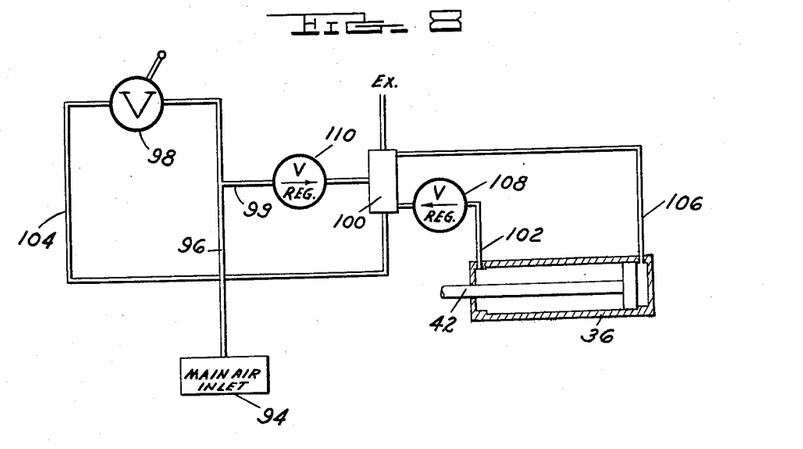
Fig. 8 is a schematic diagram of the fluid pressure system showing the piston withdrawn within the cylinder as it would be when the lubricant injector is in the idle position.

There is a source of fluid pressure such as air pressure indicated at 94, which communicates through a fluid line 96 with a pilot valve generally indicated as 98. This pilot valve responds as hereinafter set forth to tripping mechanism which forms a part of the lubricator and which is actuated by engagement with the trolley wheels. This pilot valve is normally closed and when closed, fluid under pressure extends from the inlet line 96 through a line 99 to a four-way air valve 100. This valve 100 is normally set to cause air under pressure to enter the forward end of the cylinder 36 by way of air inlet line 102. The piston 42 is therefore held in the retracted position as shown in Fig. 8.

When the pilot valve 98 is tripped, air under pressure is permitted to flow therethrough and through the line 104 to the four-way valve 100. This valve 100 responds to the air pressure from the line 104 and moves to close the discharge to the line 102 and open a discharge into line 106. Line 106 leads into the rear end of cylinder 36 and the piston is moved from the position shown in Fig. 8 to that shown in Fig. 9.

Figure 9:
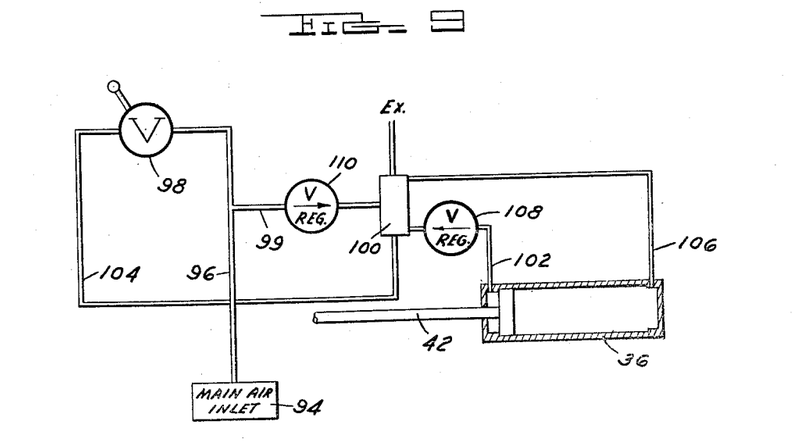
Fig. 9 is a schematic diagram of the fluid pressure system shown in Fig. 8 but showing the piston projected outwardly from the cylinder as it would be during the lubricating operation.

The valve 100 and the pilot valve 98 are both conventional constructions available on the market. The pilot valve 98 has two positions, i.e., open and closed, as shown in Figs. 9 and 8. The valve 100 is a four-way valve. It has two outlets, one of which leads into the line 102 as shown in Fig. 8 and the other of which leads into the line 106 as shown in Fig. 9. It has, of course, an inlet from line 104 and it has an exhaust outlet from the end opposite the end with which line 104 communicates as shown in Fig. 1.

There is a manually adjustable flow control valve 108 disposed in line 102. This valve 108 is also conventional. It is designed to permit the free flow of air from the valve 100 through the line 102 into the forward end of the cylinder to withdraw the piston. The piston may therefore be withdrawn quickly. This valve is adjustable, however, so that the exhaust of air from the forward end of the cylinder ahead of the outwardly moving piston can be regulated. The outward movement of the piston may therefore be regulated so that the piston, when moved outwardly, will move at a selected rate of speed to move along with the trolleys which are traveling over the conveyor rail. A fluid pressure indicator is shown at 110.

Due to the fact that the valve 108 is generally adjusted so as to slow up the outward travel of the piston 42, the lubricator injector 54, if moved solely from the piston by the bell crank lever 58, might move too slowly to effect connection of the nozzle 74 with a fitting 26. A spring 112 is therefore provided as shown in Fig. 1. One end of this spring is connected with the injector housing 50 as at 114. The opposite end of the spring is connected at 118 with the injector body so that the spring 112, as soon as it is released to act upon the injector body, projects it rapidly toward the rail. This spring therefore cooperates with the swingable bell crank lever 58 to project the injector into engagement with the lubricant fitting.

The strength of this spring 112 is such that means is provided to prevent the spring from projecting the injector body toward the rail when the piston is withdrawn into the cylinder. Such means is in the form of a latch 120, which latch is pivoted at one end as at 122 to the injector housing. The opposite end of this latch has a recess which is received over the extended end of one of the pins 66 which pin couples the yoke 64 with the collar 46 on the piston. A spring 124 holds the latch 120 so that the notch in the free end thereof engages the pin 66 as shown in Fig. 1 whenever the piston is retracted. The injector housing is provided with a stop 126 which forms an abutment to limit the swing of the latch as the piston moves outwardly.

The notch in the end of the latch is so formed that as the piston moves outwardly, the pin 66 moves out of the notch. The spring 124 yields to permit the latch to swing and accomplish this disengagement. The stop 126 holds the latch so that, as the piston is withdrawn, the pin 66 will move over the nose of the latch and come to rest in the notch. The latch therefore holds the bell crank lever so that the injector body cannot be projected by the spring 112 except when the piston itself is moved outwardly.

The pilot valve 98 heretofore referred to in the description of the fluid pressure diagrams of Figs. 8 and 9 is shown in Fig. 2 as responsive to one arm of a bifurcated cam 128. This cam is pivoted at 130 to a portion of the frame. It has a lower arm 132 which extends underneath the upper flange of the I-beam rail and is disposed in the path of travel of trolley wheels 22. The cam has an upper arm 134 which overhangs the upper flange of the I-beam rail and extends underneath a vertically reciprocable plunger 136 of the pilot valve. This plunger is held down by spring 140 as shown in Fig. 2 so that it rests upon the top of the arm 134 of the cam. Fig. 2 shows the lower arm 132 of the cam disposed in the path of travel of the trolley wheel.

When the trolley wheel engages the lower arm of the cam, it lifts it and this, in turn, through the arm 134, lifts the pin 136 against spring 140 and opens the pilot valve. When the pilot valve is opened, air under pressure is permitted to flow therethrough and through the fluid pressure line 104 to the four-way valve 100 as heretofore described in connection with the description of the fluid pressure system. After the trolley has passed from underneath the lower arm 132 of the cam, the cam drops to be placed in position to engage the succeeding trolley wheel and the pilot valve closes.

The amount of fluid pressure can be regulated by a suitable fluid pressure control valve such as 142 in Fig. 3. Forty or fifty pounds of pressure is ordinarily appropriate.

The injector proper is provided with lubricant under pressure through a line 144 from a suitable source of lubricant under pressure. Such line 144 is flexible to permit reciprocation of the injector body toward and away from the trolley assembly.

In the interior of the injector body is a nozzle element 146. A spring 148 is disposed behind this nozzle element. The outer end 74 of the nozzle is adapted to seat over the lubricant fitting 26. The nozzle is in the form of a piston having a shoulder 150 and a cap 152 is threaded over the outer end of the injector body and forms an abutment for the shoulder 150 limiting the outward projection of the nozzle piston.

The discharge passageway through the nozzle is indicated at 154. It terminates within the nozzle in a side inlet 156 which leads to an encircling recess or groove 158 about the body of the nozzle piston. The lubricant line that leads into the rear end of the injector communicates with a passage 160. This passage 160 terminates within the cavity within which the nozzle piston is reciprocably mounted. This is all shown in Figs. 4 and 5.

When the outer end 74 of the nozzle is brought into engagement with the lubricant fitting 26, the nozzle is forced rearwardly against its spring 148. As the nozzle moves rearwardly against its spring, the encircling recess 158 is brought into registration with the discharge end of the passage 160 and lubricant enters such recess and passes through the side inlet 156 into the discharge outlet 154 and to the lubricant fitting. The nozzle may be provided with sealing rings such as are indicated at 162.

It will be seen, therefore, that when connection is made of the outer end 74 of the nozzle with the fitting 26, the nozzle can move rearwardly against the spring 148 under relatively light resistance. The lubricant pressure maintained is relatively high and lubricant is quickly discharged through the nozzle into the fitting.

In the operation of the device, when a trolley wheel comes under the tripping cam 128 and lifts the same, the pilot valve is opened and air under pressure flows through the line 104 to the four-way valve 100. This valve 100 responds to such air pressure and the outlet to line 102 is closed and the inlet to line 106 is opened. The piston 42 is then moved outwardly with respect to the cylinder 36. The initial outward movement of the piston releases the latch 120 and swings the bell crank lever 58 and the injector is projected first toward the trolley to connect the nozzle with the lubricant fitting and secondly in a direction parallel to the direction of travel of the trolley to complete the lubrication of the fitting. When the trolley wheel has passed completely over the cam the lubrication of the fitting will have been completed. The cam drops and the pilot valve is closed and the flow of air through line 104 to valve 100 is discontinued. Air then flows into valve 100 through line 99. The position of valve 100 is reversed and air under pressure enters cylinder 36 through line 102 and is cut off from line 106.

The piston 42 is then quickly withdrawn. In the exhaust of air from the rear end of the cylinder, it exhausts rapidly directly through the valve 100 and discharges therefrom so that the piston is withdrawn much more rapidly than it is moved outwardly and the lubricant injector is returned to its idle position for a succeeding operation.

What we claim is:

1. A lubricator for a trolley conveyor, said conveyor having a rail, a trolley wheel assembly supported upon the rail for travel thereover and having a lubricant fitting associated with the assembly for travel therewith over the rail; said lubricator comprising a lubricant injector supported adjacent to the rail for reciprocation along a straight line toward and away from the rail and for reciprocation parallel to the travel of the trolley assembly over the rail, said injector being provided with a nozzle adapted upon movement of the injector toward the rail to engage the lubricant fitting to discharge lubricant thereinto, and injector actuating mechanism coupled with the injector to reciprocate the injector toward the rail to engage the injector nozzle with the fitting to discharge lubricant thereinto and coupled with the injector to reciprocate the injector parallel to the path of travel of the trolley assembly over the rail, said injector actuating mechanism having tripping means connected therewith and disposed adjacent to the rail, said tripping means being responsive to the movement of the trolley wheel assembly thereby to activate the actuating mechanism to reciprocate the injector.

2. A lubricator for a conveyor as defined in claim 1 characterized in that said tripping means is in the form of a U-shaped cam pivotably supported adjacent to the rail and disposed with respect thereto so that one arm of the cam projects toward the rail and above a portion of the rail and the other arm of the cam projects toward the rail and below said portion of the rail to be engaged and lifted as the trolley wheel passes thereunder and over the rail to activate the injector actuating mechanism.

3. A lubricator for a conveyor as defined in claim 1 characterized in that the injector actuating mechanism reciprocates the injector independently of the trolley wheel assembly parallel to the path of travel of the trolley wheel assembly over the rail and moves the injector in the same direction as the travel of the trolley wheel assembly and more slowly than it moves the injector in the opposite direction.

4. A lubricator for a trolley conveyor, said conveyor having a rail, a trolley wheel assembly supported upon the rail for travel thereover and having a lubricant fitting associated with the assembly for travel therewith over the rail; said lubricator comprising a lubricant injector supported adjacent to the rail for reciprocation in two perpendicularly disposed paths of reciprocation, one path of reciprocation being toward and away from the path of travel of the trolley wheel assembly over the rail and perpendicularly with respect thereto and the other path of reciprocation being parallel to the travel of the trolley assembly over the rail, said injector provided with a nozzle adapted upon movement of the injector toward the rail to engage the lubricant fitting to discharge lubricant thereinto, injector actuating mechanism coupled with the injector to reciprocate the same parallel to the path of travel of the trolley assembly over the rail, and means associated with the injector actuating mechanism and coupled therewith to be actuated thereby during the initial movement thereof in a direction parallel to the path of travel of the trolley assembly to move the injector mechanism nozzle during said initial movement toward the rail and into engagement with the lubricant fitting to discharge lubricant thereinto, said injector actuating mechanism being so coupled with the injector as to move the same parallel to the path of travel of the trolley assembly over the rail and in the same direction immediately upon completion of the movement of the injector nozzle into engagement with the lubricant fitting.

5. A lubricator for a conveyor as defined in claim 1 characterized in that said injector actuating mechanism comprises a fluid pressure piston and cylinder device, a source of fluid pressure communicating through a fluid pressure line with both ends of the piston and cylinder device, a control valve disposed in said line to direct fluid under pressure into either end of the piston and cylinder device, and characterized further in that said tripping means upon response to movement of the trolley wheel assembly thereby acts to shift the control valve to change the direction of fluid pressure flow from one end of the piston and cylinder device to the opposite end thereof, and wherein said tripping means upon cessation of its response to the movement of the trolley wheel assembly acts to reverse said valve to change the direction of fluid pressure flow to the opposite end of the piston and cylinder device.

6. A lubricator for a conveyor as defined in claim 1 characterized in that said injector actuating mechanism comprises a fluid pressure piston and cylinder device, a source of fluid pressure communicating through a fluid pressure line with both ends of the piston and cylinder device, a control valve disposed in said line operable to direct fluid under pressure into either end of the piston and cylinder device, and characterized further in that said tripping means upon response to movement of the trolley wheel assembly thereby acts to shift the control valve to change the direction of fluid pressure flow from one end of the piston and cylinder device to the opposite end thereof, and wherein said tripping means upon cessation of its response to the movement of the trolley wheel assembly thereby acts to reverse said valve to change the direction of fluid pressure flow to the opposite end of the piston and cylinder device, and wherein a manually adjustable control valve its disposed in the fluid pressure line between one end of the piston and cylinder device and the first mentioned valve, said adjustable control valve being operable to regulate the exhaust of fluid from said end of the piston and cylinder device to control the travel of the injector in one direction parallel to the travel of the trolley wheel assembly.

7. A lubricator for a trolley conveyor, said conveyor having a rail, a trolley wheel assembly supported upon the rail for travel thereover and having a lubricant fitting associated with the assembly for travel therewith over the rail; said lubricator comprising a lubricant injector assembly supported adjacent to the rail for reciprocation parallel to the travel of the trolley assembly over the rail, said injector assembly including an injector nozzle supported thereupon for reciprocation along a straight line toward and away from the rail to engage the lubricant fitting, injector actuating mechanism including a fluid pressure piston and cylinder device, a source of fluid pressure having a communication line leading to both ends of the cylinder, a valve in said line operable to selectively direct the flow of fluid under pressure into either end of the cylinder; tripping means disposed within the line of travel of the trolley assembly over the rail and responsive to movement of the assembly thereby controlling the operation of said valve, and means coupling the piston of the piston and cylinder device with the injector nozzle to move the injector nozzle toward the rail and into connection with the lubricant fitting upon initial movement of the piston outwardly from the cylinder, said piston coupled with the injector assembly so that upon connection of the injector nozzle with the fitting for discharge of lubricant thereinto the injector assembly moves with the piston parallel with the direction of travel of the trolley assembly over the rail.

8. A lubricator for a trolley conveyor, said conveyor having a rail, a trolley wheel assembly supported upon the rail for travel thereover and having a lubricant fitting associated with the assembly for travel therewith over the rail; said lubricator comprising a lubricant injector supported adjacent to the rail for reciprocation toward and away from the rail and for reciprocation parallel to the travel of the trolley assembly over the rail, said injector being provided with a nozzle adapted upon movement of the injector toward the rail to engage the lubricant fitting to discharge lubricant thereinto; injector actuating mechanism including a fluid pressure piston and cylinder device, a source of fluid pressure having a communication line leading to both ends of the cylinder, a valve in said line controlling the flow of fluid under pressure to the two ends of the cylinder, tripping means disposed within the line of travel of the trolley assembly over the rail and responsive to movement of the assembly thereby controlling the position of said valve, a lever swingably mounted upon the injector and coupled with the piston to be swung to project the injector nozzle toward the rail and into connection with the lubricant fitting upon initial movement of the piston outwardly from the cylinder, said lever adapted following projection of the injector nozzle toward the rail to cause the injector to move with the piston parallel to the rail and in the same direction as the movement of the trolley assembly over the rail.

9. A lubricator as defined in claim 8 characterized in that said lever is provided with spring means adapted to take the thrust of the lever initially received from the piston causing the lever to initially swing to project the injector nozzle toward the rail before yielding to permit the injector to travel with the piston parallel to the rail.

10. A lubricator as defined in claim 8 characterized in that said lever is provided with spring means adapted to take the thrust of the lever initially received from the piston causing the lever to initially swing to project the injector nozzle toward the rail before yielding to permit the injector to travel with the piston parallel to the rail, and characterized further in that spring urged latch means is provided to releasably hold the injector against movement toward the rail while the piston is withdrawn into the cylinder, and means is provided coupling the latch with the piston whereby upon initial movement of the piston outwardly from the cylinder the latch is released releasing the injector for movement toward the rail.

11. A lubricator for a trolley conveyor, said conveyor having a rail, a trolley wheel assembly supported upon the rail for travel thereover and having a lubricant fitting associated with the assembly for travel therewith over the rail; said lubricator comprising a lubricant injector supported adjacent to the rail for reciprocation along a straight line toward and away from the rail and for reciprocation parallel to the travel of the trolley assembly over the rail, said injector being provided with a nozzle adapted upon movement of the injector toward the rail to engage the lubricant fitting to discharge lubricant thereinto, and injector actuating mechanism coupled with the injector to reciprocate the injector toward the rail to engage the injector nozzle with the fitting to discharge lubricant thereinto and coupled with the injector to reciprocate the injector parallel to the path of travel of the trolley assembly over the rail, said injector actuating mechanism having tripping means connected therewith and disposed adjacent to the rail, said tripping means being responsive to the movement of the trolley wheel assembly thereby to activate the actuating mechanism to reciprocate the injector, said injector actuating mechanism being provided with means adjustable to vary the rate of return travel of the injector parallel to the path of travel of the trolley assembly over the rail and in the same direction therewith.

12. A lubricator for a conveyor as defined in claim 1 characterized in that said injector actuating mechanism includes fluid pressure operating means coupled with the injector to reciprocate the same along a line of travel extending parallel to the path of travel of the trolley assembly over the rail, said fluid pressure operating means also coupled with the injector to reciprocate the same along a straight line toward and away from the rail, and auxiliary actuating means also coupled with the injector to boost the travel thereof along said straight line toward the rail.

13. A lubricator for a trolley conveyor, said conveyor having a rail, a trolley wheel assembly supported upon the rail for travel thereover and having a lubricant fitting associated with the assembly for travel therewith over the rail; said lubricator comprising a lubricant injector supported adjacent to the rail for reciprocation toward and away from the rail and for reciprocation parallel to the travel of the trolley assembly over the rail, said injector provided with a nozzle adapted upon movement of the injector toward the rail to engage the lubricant fitting to discharge lubricant thereinto, injector actuating mechanism coupled with the injector to reciprocate the same parallel to the path of travel of the trolley assembly over the rail, and means associated with the injector actuating mechanism and coupled therewith to be actuated thereby during the initial movement thereof in a direction parallel to the path of travel of the trolley assembly to move the injector mechanism nozzle during said initial movement toward the rail and into engagement with the lubricant fitting to discharge lubricant thereinto, said injector actuating mechanism being so coupled with the injector as to move the same parallel to the path of travel of the trolley assembly over the rail and in the same direction immediately upon completion of the movement of the injector nozzle into engagement with the lubricant fitting, said means associated with the injector actuating mechanism to move the injector nozzle toward the rail including spring mechanism coupled with the injector nozzle and exerting pressure thereupon to project the same toward the rail and including a restraining device normally restraining said spring mechanism from so projecting the injector, said restraining device being responsive to the initial movement of the injector actuating mechanism in the same direction and parallel to the path of movement of the trolley wheel assembly to release the spring mechanism to project the injector toward the rail.

14. A lubricator for a trolley conveyor, said conveyor having a rail, a trolley wheel assembly supported upon the rail for travel thereover and having a lubricant fitting associated with the assembly for travel therewith over the rail; said lubricator comprising a lubricant injector assembly supported adjacent to the rail for reciprocation parallel to the travel of the trolley assembly over the rail, said injector assembly including an injector nozzle supported thereupon for reciprocation along a straight line toward and away from the rail to engage the lubricant fitting; injector actuating mechanism including a fluid pressure piston and cylinder device, a source of fluid pressure having a communication line leading to both ends of the cylinder, a valve in said line operable to selectively direct the flow of fluid under pressure into either end of the cylinder; tripping means disposed within the line of travel of the trolley assembly over the rail and responsive to movement of the assembly thereby controlling the operation of said valve, and means coupling the piston of the piston and cylinder device with the injector nozzle to move the injector nozzle toward the rail and into connection with the lubricant fitting upon initial movement of the piston outwardly from the cylinder, said piston coupled with the injector assembly so that upon connection of the injector nozzle with the fitting for discharge of lubricant thereinto the injector assembly moves with the piston parallel with the direction of travel of the trolley assembly over the rail, and resistingly yieldable means acting upon the injector tending to normally hold it against movement by the piston parallel to and in the same direction as the movement of the trolley assembly over the rail until the injector nozzle is connected with said lubricant fitting at which time the resistance of the resistingly yieldable means is overcome and the injector moves with the piston parallel to and with the movement of the trolley assembly over the rail.

15. A lubricator for a trolley conveyor, said conveyor having a rail, a trolley wheel assembly supported upon the rail for travel thereover and having a lubricant fitting associated with the assembly for travel therewith over the rail; said lubricator comprising a lubricant injector assembly supported adjacent to the rail for reciprocation parallel to the travel of the trolley assembly over the rail, said injector assembly including an injector nozzle supported thereupon for reciprocation along a straight line toward and away from the rail to engage the lubricant fitting; injector actuating mechanism including a fluid pressure piston and cylinder device, a source of fluid pressure having a communication line leading to both ends of the cylinder, a valve in said line operable to selectively direct the flow of fluid under pressure into either end of the cylinder; tripping means disposed within the line of travel of the trolley assembly over the rail and responsive to movement of the assembly thereby controlling the operation of said valve, and means coupling the piston of the piston and cylinder device with the injector nozzle to move the injector nozzle toward the rail and into connection with the lubricant fitting upon initial movement of the piston outwardly from the cylinder, said piston coupled with the injector assembly so that upon connection of the injector nozzle with the fitting for discharge of lubricant thereinto the injector assembly moves with the piston parallel with the direction of travel of the trolley assembly over the rail; spring means acting upon the injector tending to normally hold it against movement by the piston parallel to and in the same direction as the movement of the trolley assembly over the rail until the injector nozzle is connected with said lubricant fitting at which time the resistance of the spring is overcome and the injector moves with the piston parallel to and with the movement of the trolley assembly over the rail and spring means acting upon the injector nozzle tending to project it toward the rail and latch mechanism releasably latching the injector against projection toward the rail when the piston is withdrawn into the cylinder, said piston being coupled with the latch mechanism to actuate the same to release the injector to projection by its spring toward the rail upon initial movement of the piston outwardly from the cylinder.

References Cited in the file of this patent

UNITED STATES PATENTS

| | | |
|---|---|---|
| 2,502,659 | Livingston | Apr. 4, 1950 |
| 2,624,423 | Moore | Jan. 6, 1953 |
| 2,754,932 | Clements | July 17, 1956 |